United States Patent

[11] 3,634,886

| [72] | Inventor | Theodore W. Synowka<br>1919 Norwich Road, Glen Burnie, Md. 21061 |
|---|---|---|
| [21] | Appl. No. | 853,352 |
| [22] | Filed | Aug. 27, 1969 |
| [45] | Patented | Jan. 11, 1972<br>Continuation-in-part of application Ser. No. 582,202, Sept. 22, 1966, now abandoned. This application Aug. 27, 1969, Ser. No. 853,352 |

[54] DIGITAL ANTENNA SCAN PATTERN GENERATOR
5 Claims, 4 Drawing Figs.

[52] U.S. Cl. .................................................. 340/347 DA, 343/17.7
[51] Int. Cl. .................................................. H03k 13/04
[50] Field of Search ....................................... 340/347, 166; 343/17.7

[56] References Cited
UNITED STATES PATENTS

| 3,184,734 | 5/1965 | Uren et al. ..................... | 340/347 |
| 3,374,481 | 3/1968 | Lupinetti ..................... | 343/17.7 |
| 3,216,001 | 11/1965 | Hinrichs ..................... | 340/347 AD |

*Primary Examiner*—Daryl W. Cook
*Assistant Examiner*—Leo H. Boudreau
*Attorneys*—William G. Gapcynski and Lawrence A. Neureither

ABSTRACT: A device for generating simulated scan patterns of conventional search radar antennas comprising an electronic pulse generator, a delay pulse width control unit, decoding means to apply a pulse sequentially to one in a series of individually adjustable load potentiometers, and an OR gate connected to the wiper arms of the potentiometers, thus providing as an output a sequential train of pulses whose amplitude can be set to reflect a desired antenna pattern.

3,634,886

DIGITAL ANTENNA SCAN PATTERN GENERATOR

CROSS REFERENCE TO RELATED APPLICATIONS

This application is a continuation-in-part of application Ser. No. 582,202, filed Sept. 22, 1966, now abandoned.

BACKGROUND OF THE INVENTION

1. Field of the Invention

This invention relates to a digital electronic device which generates simulated scan patterns of a conventional radar antenna.

2. Description of the Prior Art

In applications requiring simulation of the radar target echo pulses which appear at the video output of a conventional search radar, characteristics such as scintillation, antenna gain pattern, thermal noise, and target distance must be accounted for in the simulator system. This invention is particularly concerned with providing means for simulating the effect of the antenna gain pattern on the target echo pulses.

Radar systems normally employ directive antennas for transmission and reception, and the gain of these antennas is a function of the angular distance of the target from the axis of maximum sensitivity of the antenna. In practice, the target will be on the axis of maximum antenna gain for only a short period of time, and as the antenna scans past the target, the amplitude of the returned pulses will be modulated by the shape of the antenna gain pattern.

The problem of generating a series of pulses whose amplitude varies according to a particular antenna pattern has been solved by prior art devices utilizing electromechanical techniques. Although a fairly satisfactory pattern can be generated by electromechanical means, significant drawbacks are inherent in these methods. Since most of the prior art devices include a motor driving a shaped potentiometer, these devices are expensive, are subject to wear on the movable parts, and are able to generate only one pattern shape.

SUMMARY OF THE INVENTION

The invention simulates the antenna pattern modulation of target echo pulses by digital electronic means. A source of pulses is encoded by a counter unit, and the pulses are then decoded by a plurality of NAND gates so that a plurality of circuits comprising a voltage source and a variable potentiometer are individually and sequentially enabled. The voltage outputs from the potentiometer wiper arms are connected to an OR gate so that the system output is a train of pulses whose amplitudes may be individually set to simulate a desired antenna pattern.

Accordingly, it is an object of this invention to provide a reliable and inexpensive digital electronic system to simulate an antenna scan pattern.

It is a further object of this invention to provide an antenna scan pattern generator with capability of generating a plurality of different scan patterns.

DESCRIPTION OF THE PREFERRED EMBODIMENT

Figure 1:
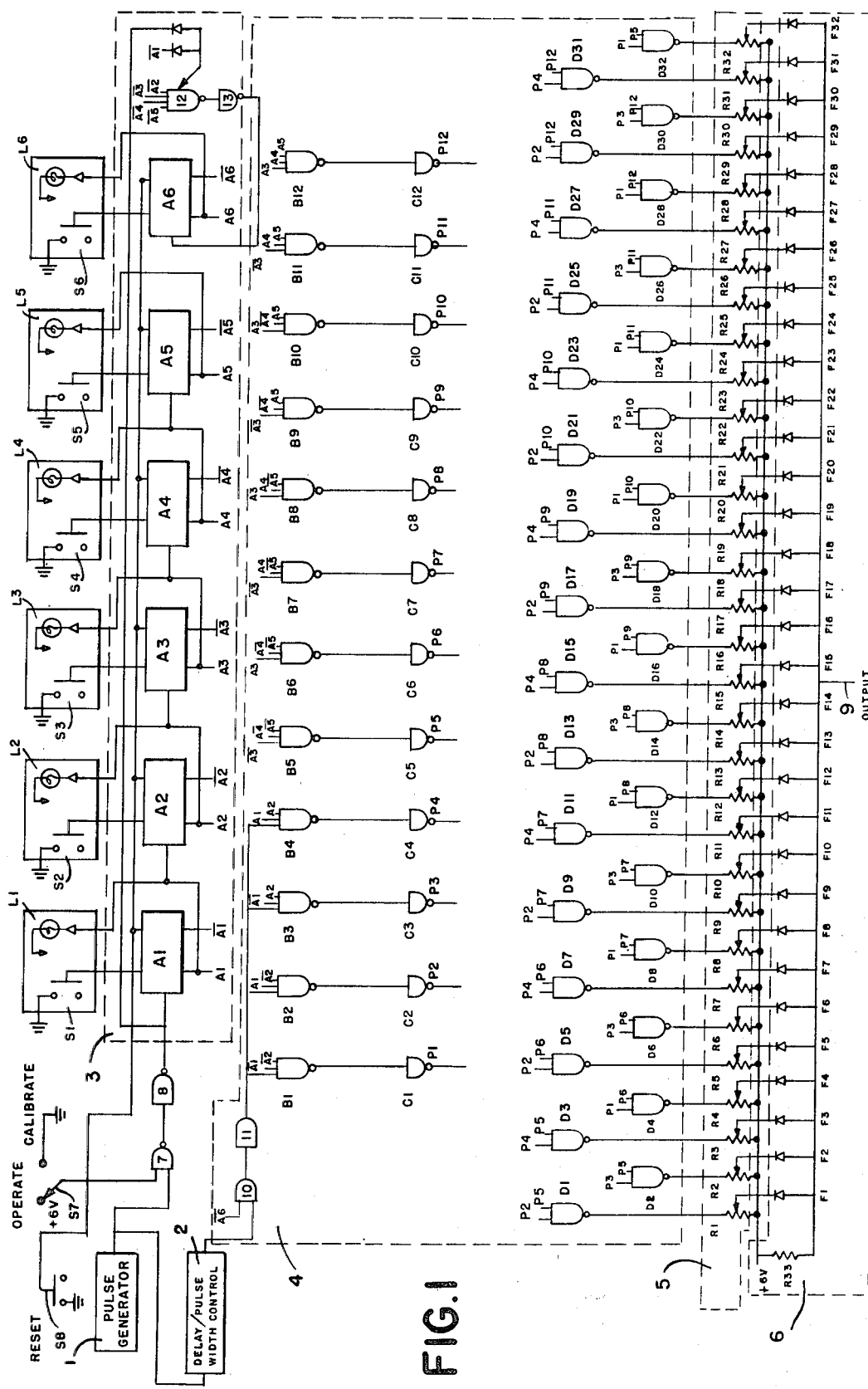
FIG. 1 is a wiring diagram of the invention.

Referring to FIG. 1, the invention comprises a pulse generator 1, a delay/pulse width control unit 2, a counter 3, a decoder unit 4, a plurality of potentiometer load resistors 5, and an output OR-gate 6. The pulse generator 1 generates a continuous train of pulses at a repetition rate which can be adjusted to meet various application requirements, typically between 250 and 1,500 pulses per second. The output of the pulse generator 1 is connected to the delay/pulse width control unit 2 and also to the counter 3 through NAND-gates 7 and 8. The counter 3 is comprised of six bistable multivibrator units, A1, A2, A3, A4, A5 and A6, serially connected so that the output of one bistable unit provides the input to the next bistable unit, and the counter will change states with each application of an input pulse, Connected in this manner the counter will assume $2^6$ or 64 unique states in response to pulses from the pulse generator, and after the 64th pulse it will recycle and assume its original state. Each bistable unit is provided with two outputs, one of which will be a logical "1" and the other will be a logical "0" at a given instant.

Figure 4:
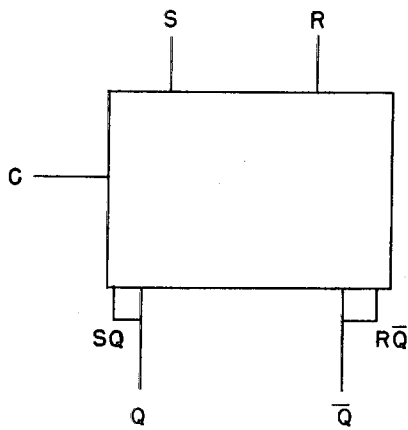
FIG. 4 is a functional diagram of one of the bistable units.

Referring to FIG. 4, a bistable unit functional diagram is shown. When used as a binary counter element, the clocked set $S\overline{Q}$ is connected to Q, and the clocked reset $R\overline{Q}$ is connected to $\overline{Q}$. Thus, on each negative going clock pulse applied at C, the output of the bistable unit will change state. The Q output will be a "1" (voltage output) in the set state and "0" (ground) in the reset state. The $\overline{Q}$ output will always be opposite to the Q output. A ground applied to terminal S will set the bistable unit, and the Q output will be a "1." The application of a ground to the R terminal will reset the bistable unit, and the Q output will be a "0."

The pulses from the pulse generator 1 also are directed into the delay/pulse width control unit 2 and a fixed time delay, to simulate the echo return time, is introduced. Means are also included to vary the width of the pulse. These functions may be accomplished by conventional circuits; for example, through the use of a monostable multivibrator and a delay line.

The output of the delay/pulse width control unit 2 and the outputs from the bistable units A1 through A6 are interconnected to the decoder unit 4 according to conventional logical theory so that one output pulse is produced at one decoder output line for a period of time equal to the length of the pulse from the delay/pulse width control unit 2. To illustrate the operation of the decoder unit the process of producing one output pulse will be discussed.

The decoder unit is comprised of a plurality of NAND-gates which can be described by the truth table shown below in which a "1" condition represents voltage presence and a "0" represents the absence of a voltage:

TABLE

| INPUTS | | | OUTPUT |
|---|---|---|---|
| A | B | C | |
| 0 | 0 | 0 | 1 |
| 0 | 0 | 1 | 1 |
| 0 | 1 | 0 | 1 |
| 0 | 1 | 1 | 1 |
| 1 | 0 | 0 | 1 |
| 1 | 0 | 1 | 1 |
| 1 | 1 | 0 | 1 |
| 1 | 1 | 1 | 0 |

The "0" condition at the output, which is produced only by a "1" at each input, will be referred to as the "enabled" state in describing the operation of the gate, and the term "disabled" will be used to refer to the presence of a "1" at the output.

An example of the decoding follows: assume the counter was originally set at zero and has received three pulses. This state requires a "1" state at A1 and A2 and "0" state at A3, A4, and A5. Consequently, a "1" condition will also exist at $\overline{A3}$, $\overline{A4}$, $\overline{A5}$ and a "0" condition will exist at $\overline{A1}$ and $\overline{A2}$. Examination of FIG. 1 will show that only gate B5 of the B series of gates is enabled at this time as its inputs $\overline{A3}$, $\overline{A4}$, and $\overline{A5}$ each are in the "1" state. The enabled output of gate B5 is inverted by gate C5 so that a "1" is present at point P5. Examination of gates B1, B2, B3, and B4 reveals that the inputs to these gates consist of a combination of the delayed pulse om the pulse generator 1 and any two of A1, A2, $\overline{A1}$, and $\overline{A2}$. Since the pulse from the pulse generator will be present r a preselected period in each count, then enabling one of e four gates depends on presence of the proper combination A1, A2, $\overline{A1}$, and $\overline{A2}$. There are four possible combinations A1, A2, $\overline{A1}$, and $\overline{A2}$, and each is represented by the input inditions at one of gates B1, B2, B3, or B4. Thus on each unt one of the gates B1, B2, B3, or B4 will be enabled for a riod of time equal to the pulse width selected by the lay/pulse width unit 2, and the enablement will occur at a ne after the generation of the input pulse from the pulse nerator 1 which is equal to the delay introduced by the lay/pulse width control unit 2. Since A1 and A2 are each in e "1" state when the count of three is in the counter unit, te B4 will be enabled when the delayed pulse from the lay/pulse width control unit is applied. The enabled output om B4 is inverted by C4 so that a "1" is present at P4. The mbination of "1" on P4 and P5 will enable only gate D3 in e D series of gates. When gate D3 is enabled, the circuit om the positive power supply through R33 and potentiometer R3 and diode F3 to ground is completed. The voltage at e output 9 at the junction of R33 and diodes F1 through F32 ll be a function of the value set on potentiometer R3, and it ll be present at the output 9 for a period of time equal to the lse width selected by the delay/pulse width control unit 2. Thus, as each driving gate is enabled, the voltage at the output 9 will be a function of the setting of the potentiometer asciated with each gate; by setting the potentiometers appropriately, a wide variety of output functions can be simued. In the present embodiment one driving gate is enabled r each of the first 32 counts of the counter; on the 33rd pulse e bistable unit A6 is triggered through gates 12 and 13, and e voltage on $\overline{A6}$ goes from "1" to "0," thus disabling gate 10 d preventing the enablement of any of the driving gates. On e 64th pulse the bistable unit A6 is again triggered and $\overline{A6}$ turns to the "1" state, thus returning the counter to its iginal zero count state and removing the inhibit command om gate 10. Thus, a simulated scan occurs every 64 pulses.

The invention may be modified by increasing or decreasing e number of states in the counter. Corresponding changes ould also be reflected in the decoder and the load potenmeters. Multiple range and pulse widths of targets can be nulated by the addition of selectable circuitry, and the pulse es may be selected to generate scans other than those possi- with the present implementation. Other types of logic ele-nts may also be used in the design of the digital scan pattern nerator. All of these modifications can be made without derting from the principles of the present embodied invention.

The scan pattern generator is also provided with means for librating the unit to generate a desired antenna pattern and ans for visually observing the state of the counter. Switch is connected to the reset input of each bistable unit, and en switch S8 is connected to ground, all the bistable units e reset to the "0" state. Switches S1 through S6 connect the et" input to ground and thus place a "1" into the corponding bistable unit. Switch S7, when in the "calibrate" sition, disables gate 7, thus preventing the pulses from the lse generator 1 from being fed into the counter; then the itches S1 through S6 can be used to place any desired mber into the counter, and the output potentiometer corponding to the number placed into the counter can be set give the desired value of output voltage. In this manner all potentiometers R1 through R32 can be set to simulate a en antenna pattern. After the potentiometers are set, the itch S7 is placed back in the "operate" position, and the n pattern generator will simulate the desired antenna pattern.

amps L1 through L6 are connected to outputs A1 through respectively of the bistable units so that a visual indication he state of the counter is provided.

Figure 2:
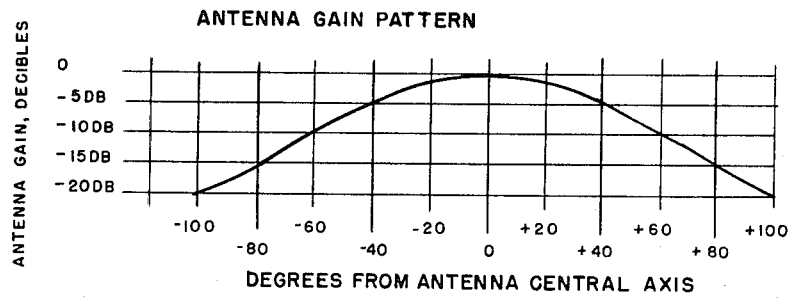
FIG. 2 is a graph of the gain curve of a radar antenna.

As an example of the operation of the scan pattern generathe process of generating the scan pattern resulting from antenna whose sensitivity pattern is that shown in FIG. 2 will be described. For simplicity of illustration the scan rate will be chosen so that echo pulses are returned for each 20° differential from the zero axis of the antenna. From FIG. 2 the following relative values of the echo pulse as a function of the angular distance of the target from the zero axis of the antenna can be derived:

| Distance from the Antenna Axis | Relative Strength of the Echo Pulse | Pulse Number |
|---|---|---|
| −100° | −20 db. | 1 |
| −80° | −15 db. | 4 |
| −60° | −10 db. | 7 |
| −40° | −5 db. | 10 |
| −20° | −2.5 db. | 13 |
| 0 | 0 db. | 16 |
| +20° | −2.5 db. | 19 |
| +40° | −5 db. | 22 |
| +60° | −10 db. | 25 |
| +80° | −15 db. | 28 |
| +100° | −20 db. | 31 |

Figure 3:
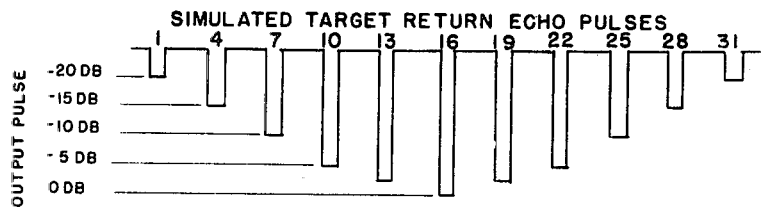
FIG. 3 is the graph of the output voltage of the invention corresponding to the simulated antenna pattern of the antenna of FIG. 2.

To program the scan pattern generator for this particular antenna function, switch S7 is placed in the calibrate position, and switch S8 is momentarily closed to reset the counter to the zero state. Then switch S1 is closed to place a binary count of 100,000 in the counter. This count means that A1 is in the "1" state and A2, A3, A4, A5, and A6 are in the "0" state. Thus, gate B5 will be enabled, and gate B2 will be enabled by the delayed pulse from the delay/pulse width control unit 2. The output from these two gates will be inverted by gates C5 and C2, respectively and will enable driving gate D1, thus completing the circuit from the power supply through R33 and potentiometer R1. R1 can now be set so that the desired value of voltage, −20 db. from the reference, will appear at the output 9. In a similar manner the counts 4, 7, 10, 13, 16, 19, 22, 25, 28, and 31 can be placed into the counter and the corresponding potentiometers adjusted. The potentiometers corresponding to the unused pulses are set so that the maximum resistance appears between the gate connection and the wiper arm of the potentiometer so that no target echo pulses are applied to the OR gate from them. The output of the scan generator at 9 is shown in FIG. 3.

I claim:

1. An antenna scan pattern generator for producing a simulated radar antenna pattern comprising:
   a. a source of an input pulse train;
   b. a plurality of bistable circuits interconnected to form a counting circuit whose output state changes in response to each pulse of said input pulse train thereby producing a predetermined output response;
   c. means for delaying said pulse train fed simultaneously with said counting circuit by said input pulse train;
   d. a first series of NAND gates selectively responsive to the output of said delaying means and a portion of said counting circuit outputs;
   e. a second series of NAND gates selectively responsive to the remaining outputs of said counting circuit;
   f. inverting means individually connected to each of said second series of NAND gates;
   g. a third series of NAND gates selectively responsive to the outputs of said inverting means;
   h. a variable resistor connected to each output of said third series of NAND gates and to a voltage source; and
   i. an OR gate connected to the wiper arm of each of said variable resistors for collectively passing the output from said variable resistor wiper arm to the output of said OR gate.

2. The device of claim 1 further comprising means for inhibiting the output of said first series of NAND gates so that the output of the scan pattern generator may be blanked for a preselected period.

3. The device of claim 1 further comprising switch means for presetting the state of said counting circuit for calibration purposes and visual means for indicating the state of said counting circuit.

4. The device of claim 1 further comprising means to control the width of the pulses from the output of said delaying means.

5. The device of claim 1 in which
   a. said counting circuit comprises six serially connected bistable multivibrators;
   b. said first series of NAND gates comprises four NAND gates each having three inputs, one of said inputs selectively connected to said delay means and the remaining two inputs selectively connected to two of said bistable multivibrators of said counting circuit;
   c. said second series of NAND gates comprises eight NAND gates each having three inputs, said inputs being selectively connected to the outputs of three of said bistable multivibrators of the counting unit;
   d. said inverting means comprises a NAND gate; and
   e. said third series of NAND gates comprises 32 NAND gates each having two inputs, the first one of said inputs selectively connected to outputs of said first series of NAND gates and the second one of said inputs selectively connected to outputs of said second series of NAND gates.

* * * * *